United States Patent [19]
Atsuta et al.

[11] Patent Number: 6,133,671
[45] Date of Patent: Oct. 17, 2000

[54] VIBRATION TYPE MOTOR DEVICE

[75] Inventors: Akio Atsuta, Yokosuka; Tadashi Hayashi, Yokohama, both of Japan

[73] Assignee: Canon Kabushiki Kaisha, Tokyo, Japan

[21] Appl. No.: 09/062,670

[22] Filed: Apr. 20, 1998

[30] Foreign Application Priority Data

Apr. 21, 1997 [JP] Japan ..................................... 9-103387

[51] Int. Cl.[7] .................................................. H02N 2/00
[52] U.S. Cl. ............................... 310/316.01; 310/316.02; 310/366
[58] Field of Search ............................. 310/316.01, 320, 310/366, 316.02

[56] References Cited

U.S. PATENT DOCUMENTS

| | | | |
|---|---|---|---|
| 4,713,571 | 12/1987 | Suzuki et al. | 310/316.03 |
| 5,130,598 | 7/1992 | Verheyen et al. | 310/316.03 |
| 5,134,333 | 7/1992 | Atsuta | 310/323 |
| 5,231,325 | 7/1993 | Tamai et al. | 310/323 |
| 5,247,221 | 9/1993 | Atsuta | 310/323 |
| 5,298,829 | 3/1994 | Tsukimoto | 310/323 |
| 5,300,850 | 4/1994 | Okumura | 310/323 |
| 5,612,598 | 3/1997 | Fukui et al. | 318/116 |
| 5,656,881 | 8/1997 | Atsuta | 310/316 |
| 5,739,621 | 4/1998 | Atsuta et al. | 310/316 |
| 5,740,478 | 4/1998 | Kobayashi | 396/121 |

FOREIGN PATENT DOCUMENTS 25 34 245  2/1976  Germany ........................ 310/316.01

*Primary Examiner*—Thomas M. Dougherty
*Attorney, Agent, or Firm*—Fitzpatrick, Cella, Harper & Scinto

[57] ABSTRACT

A vibration type motor of a floating drive scheme is provided in which the voltage applied to a driving piezoelectric element and the voltage generated by a detection piezoelectric element are stepped down by impedance elements and input to a processing circuit, thereby allowing the use of a TTL logic circuit as the processing circuit.

23 Claims, 12 Drawing Sheets

VIBRATION TYPE MOTOR DEVICE

BACKGROUND OF THE INVENTION

1. Field of the Invention

The present invention relates to a driving device for a vibration type actuator such as a vibration wave motor and, more particularly, to a driving device for detecting vibration state and controlling the alternating signal to be applied to a piezoelectric element serving as a driving electromechanical energy converting element portion.

2. Related Background Art

Recently, a vibration type actuator such as a vibration wave motor has been developed and put into practice by the present applicants. This well know vibration type actuator uses an electro-mechanical energy converting element such as a piezoelectric element or electrostrictive element to generate high-frequency vibration by applying an alternating signal thereto, and extracts the vibration energy as continuous mechanical motion. Since this operation principle is known, a description thereof will be omitted.

FIG. 9 is a side view a conventional bar-shaped vibration wave motor as a vibration type actuator and also shows a wiring diagram of an arrangement for applying a voltage to a piezoelectric element and extracting the output voltage. A vibrator 101 is a constituent of the bar-shaped vibration wave motor and is a combination of a piezoelectric element or electrostrictive element and an elastic member.

The piezoelectric element portion of the vibrator 101 is constituted by A- and B-phase driving piezoelectric elements a1, a2, b1, and b2 and a vibration detection piezoelectric element S1. This piezoelectric element is driven by respectively applying an A-phase voltage to an electrode plate A-d sandwiched between the A-phase piezoelectric elements a1 and a2 and a B-phase voltage to an electrode plate B-d sandwiched between the B-phase piezoelectric elements b1 and b2.

In this case, ground electrode plates GND-d are arranged on the rear sides of the A-phase piezoelectric elements a1 and a2 and the B-phase piezoelectric elements b1 and b2 to set the GND potential.

Similarly, one side (on the B-phase side) of the vibration detection piezoelectric element S1 is set at the GND potential, and a signal is extracted from an electrode plate S-d on the other side. The signal extraction side (on the electrode plate S-d side) of a vibration detection piezoelectric element S is in contact with a metal block. This block is insulated from the GND potential by an insulating sheet. With this structure, an output voltage corresponding to the vibrations of the vibration detection piezoelectric element S can be directly obtained therefrom. A resonant frequency or the like is then obtained from the magnitude of this voltage or the phase difference between itself and the driving voltage.

FIG. 10 shows a driving circuit for such a vibration wave motor. This circuit includes an oscillator 2 for generating an alternating voltage, a 900 phase shifter 3, switching circuits 4 and 5 for switching alternating voltages (signals) from the oscillator 2 and the 900 phase shifter 3 with a power supply voltage, and step-up coils 6 and 7 for amplifying pulse voltages switched by the switching circuits 4 and 5.

This circuit also includes a phase difference detector 8 for detecting the phase difference between signals from the A-phase driving electrode and the vibration detection piezoelectric element S and a control microcomputer 10 for instructing the oscillator 2 to supply an alternating signal having a given frequency at which the vibration wave motor is to be driven. Signals from the driving electrode A and the vibration detection electrode S are regular sine waves. These signals are converted into square waves by high-voltage comparators 11 and 12. The phase difference detector 8 can output a signal corresponding to the phase difference between these waves to the microcomputer 10. The microcomputer 10 determines any deviation from the resonant frequency at present using this signal, and performs control to drive the motor at an optimal frequency. In this manner, driving frequency control can be performed.

In addition, since the vibration wave motor uses a piezoelectric element, the driving voltage is undesirably high. As a means for solving this problem, the use of a floating structure like the one shown in FIG. 11, by which the motor can be driven at a voltage about ½ that required in the prior art, has been considered. This structure is known and hence will be briefly described below. Piezoelectric elements a1 and b1 are respectively sandwiched between electrode plates A-d and A'-d and between electrode plates B-d and B'-d while the upper and lower surfaces of the piezoelectric elements are in contact with these electrode plates. However, the adjacent electrode plates A'-d and B-d are insulated from each other by an insulating sheet.

FIG. 12 shows a driving circuit for such a vibration wave motor. This circuit includes driving electrodes A, A', B, and B' for applying alternating voltages to the piezoelectric elements or electrostriction elements, an oscillator 2 for generating an alternating voltage, a 90° phase shifter 3, switching circuits 4A, 4A', 5B, and 5B' for switching alternating voltages from the oscillator 2 and the 90° phase shifter 3 with a power supply voltage, and step-up coils 6 and 7 for amplifying pulse voltages switched by the switching circuits 4A, 4A', 5B, and 5B'.

This circuit also includes a control microcomputer 10 for instructing the oscillator 2 to apply an alternating voltage having a frequency at which the vibration wave motor is to be driven. In this case, signals having a phase difference of 180° are input to the switching circuits 4A, 4A', 5B, and 5B' to perform switching operation at the corresponding timing. At this time, an apparent voltage twice the power supply voltage is applied to each of the driving electrodes A, A', B, and B' of the vibrator through a corresponding coil. The motor can therefore be driven at a voltage ½ that required in the prior art.

As a vibration state detection means in this structure, a differential comparator for obtaining phase information from the difference between the voltages across two ends of each of the driving and vibration detection piezoelectric elements is used to convert the respective waveforms into square waves, as shown in FIG. 12. By detecting the phase difference between these square waves, any deviation from the resonant frequency can be determined.

SUMMARY OF THE INVENTION

One aspect of the application is to provide a device as the above vibration type actuator device, in which when the voltage detected by a vibration detection electro-mechanical energy converting element and the voltage applied to a driving electro-mechanical energy converting element are to be received and processed, a processing circuit can process the voltages within the TTL level.

One aspect of the application is to provide a device including voltage dividing circuits for voltage-dividing the above detected voltage and applied voltage at the same voltage division ratio, and inputting the voltage-divided voltages to a processing circuit.

The above and other objects, features, and advantages of the present invention will be apparent from the following detailed description in conjunction with the accompanying drawings and the appended claims.

BRIEF DESCRIPTION OF THE DRAWINGS

FIGS. 2A, 2B and 2C are timing charts in the circuit in FIG. 1, in which FIG. 2A is a timing chart showing the voltage waveforms on the input side of a voltage dividing circuit, FIG. 2B is a timing chart showing the voltage waveforms after voltage division, and FIG. 2C is a timing chart showing the waveforms of outputs from comparators;

FIGS. 6A, 6B and 6C are timing charts in the circuit in FIG. 5, in which FIG. 6A is a timing chart showing the voltage waveforms on the input side of a clipping circuit, FIG. 6B is a timing chart showing the voltage waveforms on the output side of the clipping circuit, and FIG. 6C is a timing chart showing the waveforms of outputs from comparators;

DESCRIPTION OF THE PREFERRED EMBODIMENTS (First Embodiment)

Figure 1:
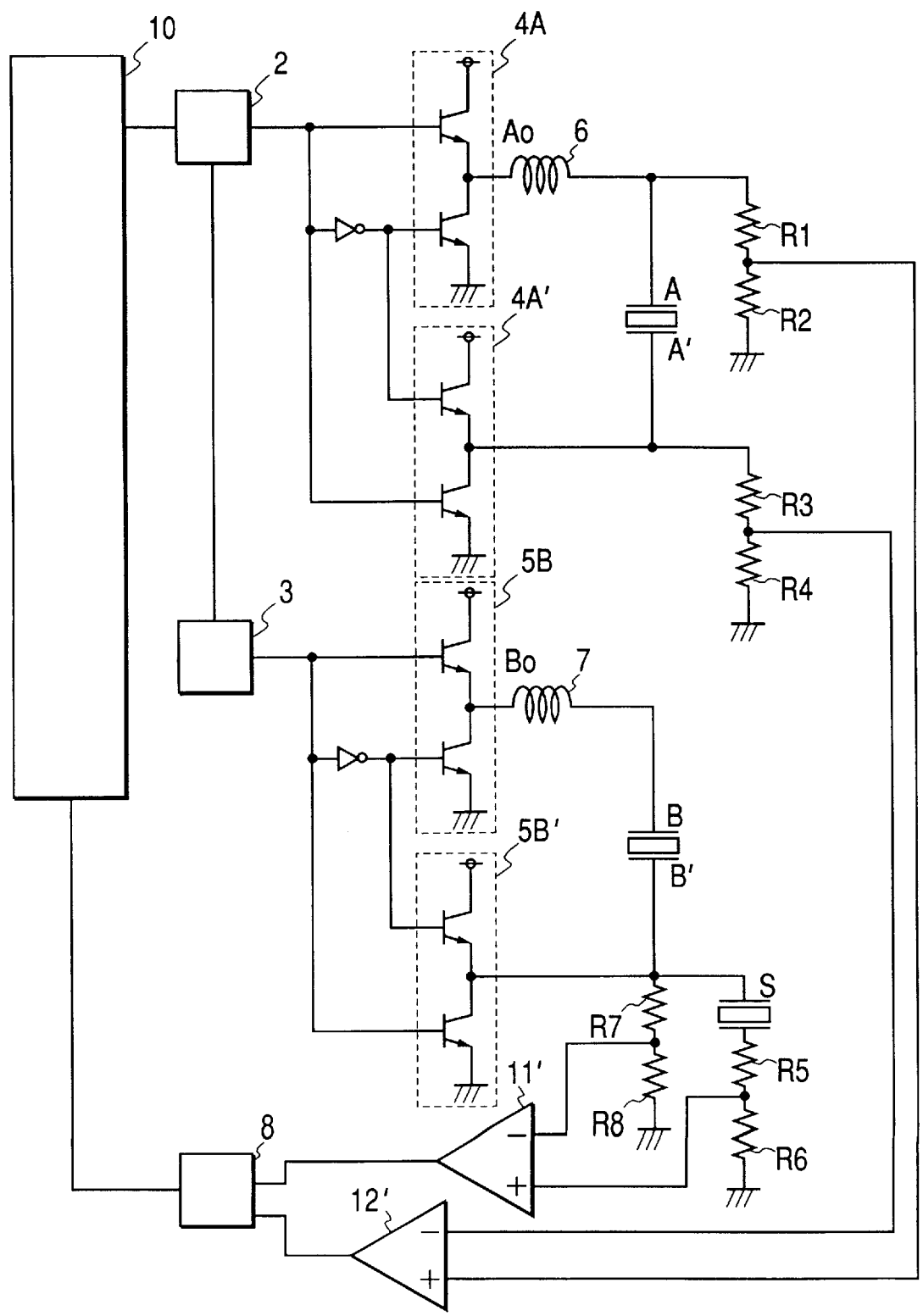
FIG. 1 is a schematic circuit diagram of a driving device for a vibration wave motor according to the first embodiment of the present invention.

FIG. 1 shows the first embodiment.

Figure 12:
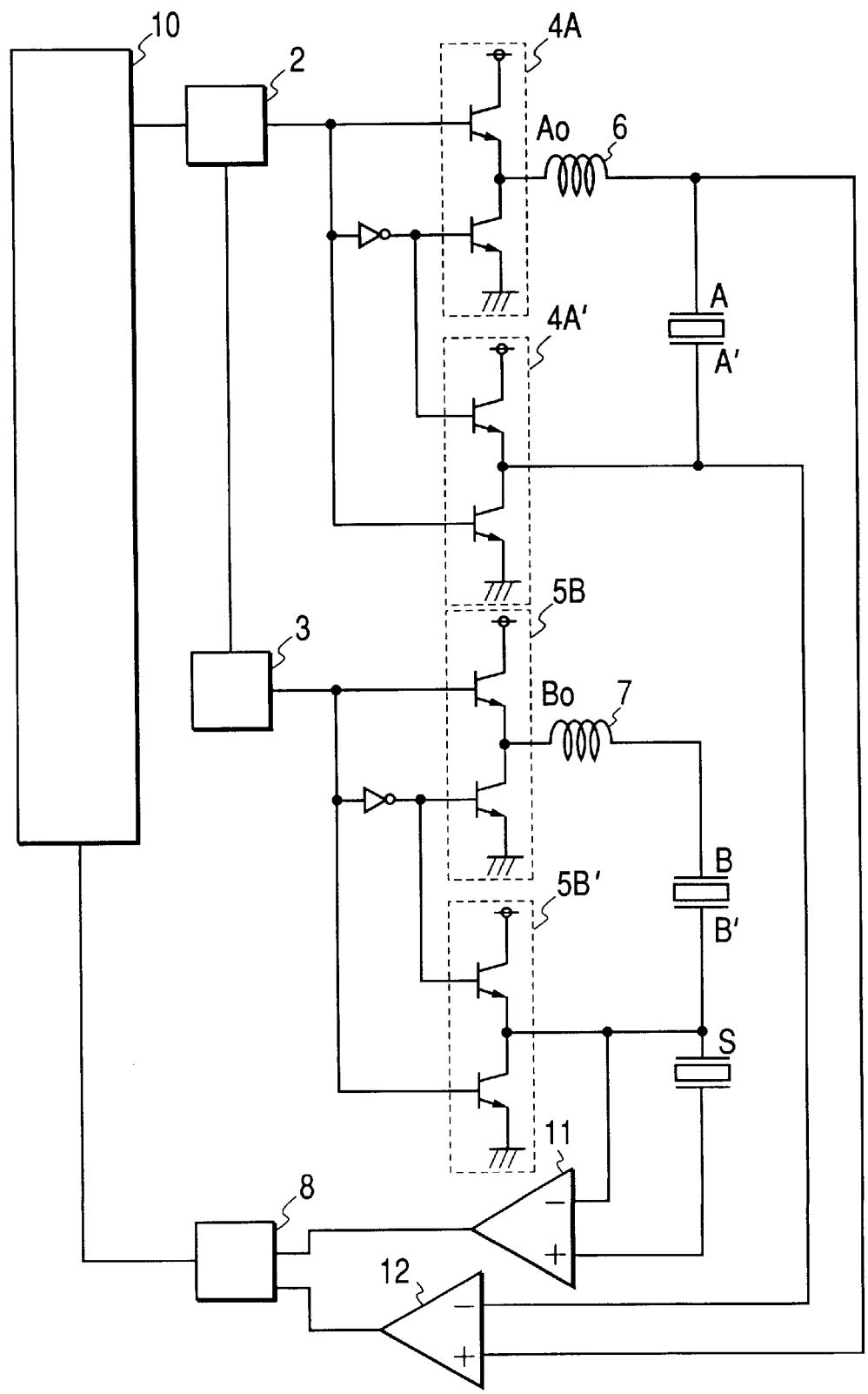
FIG. 12 is a schematic circuit diagram of a driving device for the vibration wave motor in FIG. 11.

FIG. 1 is a schematic circuit diagram of a driving device for a vibration wave motor according to the first embodiment to which the driving device for the vibration type actuator according to the present invention is applied. The same reference numerals in FIG. 1 denote the same parts as in the conventional circuit in FIG. 12, and a description thereof will be omitted.

In the conventional circuit, output voltages from the driving piezoelectric element and the vibration detection piezoelectric element are directly applied to the high-voltage comparators 11 and 12. In contrast to this, in this embodiment, an output from one end of an A-phase driving piezoelectric element is voltage-divided by resistors R1 and R2, and an output from the other end is voltage-divided by resistors R3 and R4. The voltage-divided outputs from the respective ends of the A-phase piezoelectric element are respectively input to the "+" and "−" terminals of a comparator 12'.

Similarly, an output from one end of a vibration detection piezoelectric element S is voltage-divided by resistors R5 and R6, and an output from the other end is voltage-divided by resistors R7 and R8. The voltage-divided outputs from the vibration detection piezoelectric element are respectively input to the "+" and "−" terminals of a comparator 11'.

These comparators 11' and 12' are not of a high-voltage type but of an ordinary type. Outputs from the comparators 11' and 12' are input to a phase difference detector 8 to be used for drive control. The comparators 11' and 12' constitute a processing circuit.

Figure 2A:
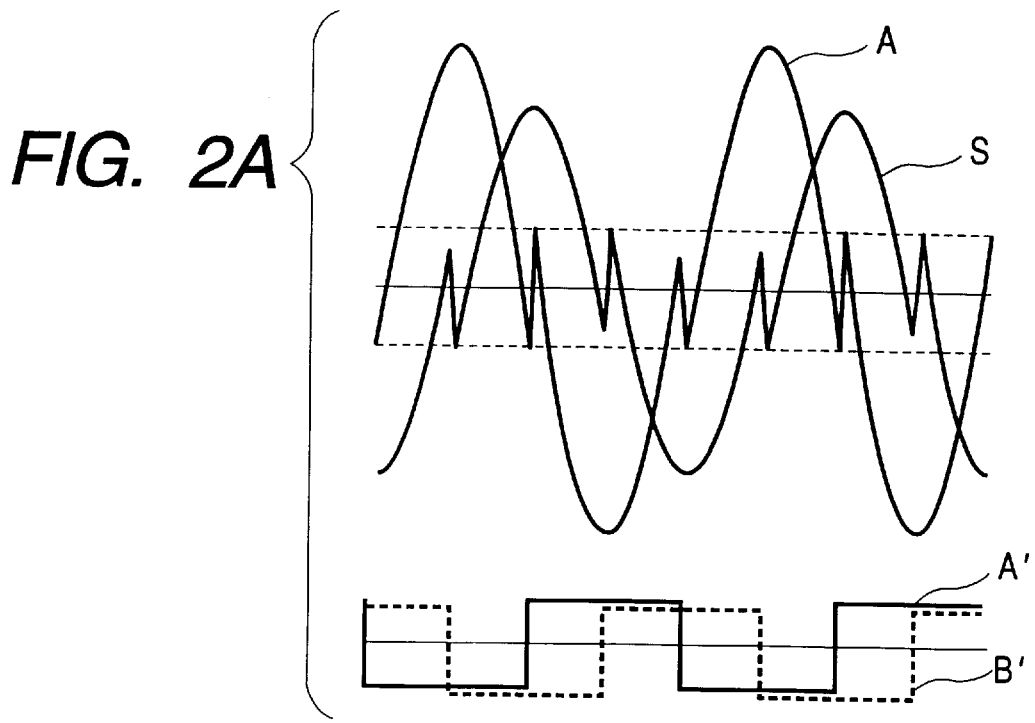
Figure 2B:
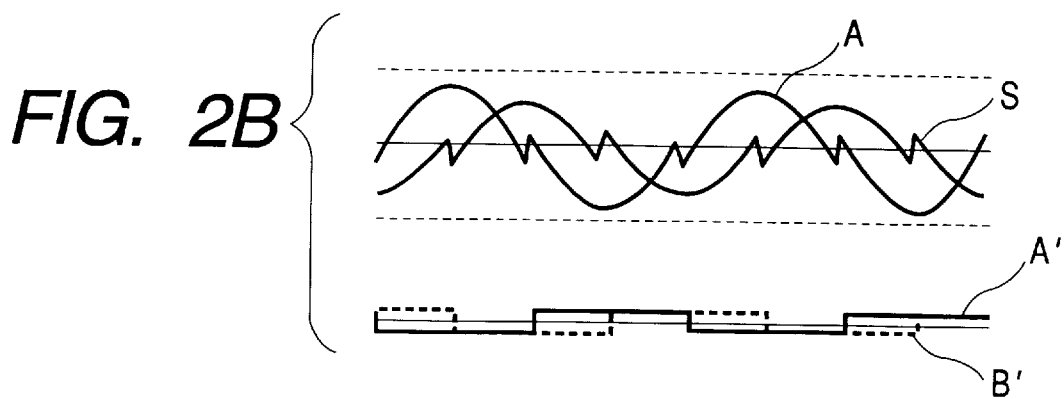
Figure 2C:
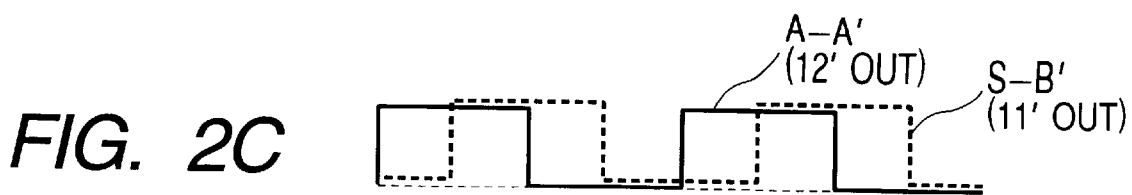

FIG. 2A shows the waveforms of voltages output from the driving piezoelectric element and the vibration detection element in a case wherein the driving piezoelectric element of the vibration wave motor in this embodiment has a floating structure. FIG. 2B shows the waveforms of output voltages from the above voltage dividing circuit. FIG. 2C shows the waveforms of outputs from the comparators.

As shown in FIG. 2A, since voltages A' and B' are respectively applied to the other end of the A-phase driving piezoelectric element and the other end of the B-phase driving piezoelectric element, and the voltage B' is applied to one end of the vibration detection piezoelectric element S, the waveforms of output voltages from the driving piezoelectric element and the vibration detection piezoelectric element are those obtained by superimposing the above voltages A' and B' on the output voltages.

Obviously, in this case, since the voltages levels are high, comparators which can operate only up to the TTL level cannot process such high voltages. The TTL level means the signal level wherein a digital circuit is capable of processing. In this embodiment, analog signals of 0 V to 5 V are used, and voltages of 0 V and 5 V respectively correspond to levels 0 and 1.

In this embodiment, the voltage dividing circuits for voltage-dividing outputs from the A-phase driving piezoelectric element and the vibration detection piezoelectric element S voltage-divide the voltages into voltages with levels falling within the range lower than the TTL level. The resultant voltages are then input to the comparators. In this case, the voltages A' and B' at the other end of the A-phase driving piezoelectric element and the other end of the B-phase driving piezoelectric element must also be voltage-divided at the same voltage division ratio on the positive and negative input sides of each comparator.

FIG. 2C shows the output waveforms obtained from the comparators after the output voltages from the driving piezoelectric element and the vibration detection piezoelectric element are processed in the above manner. Referring to FIG. 2C, the waveform (solid line) of the output voltage from the driving piezoelectric element, and the waveform (dashed line) of the output voltage from the vibration detection piezoelectric element are converted into square waveforms. The relationship between the phases of the output voltages is accurately detected in this manner.

As described above, since output voltages from the driving piezoelectric element and the vibration detection piezoelectric element are compared after they are voltage-divided, accurate phase information can be obtained from even high voltages.

(Second Embodiment)

Figure 3:
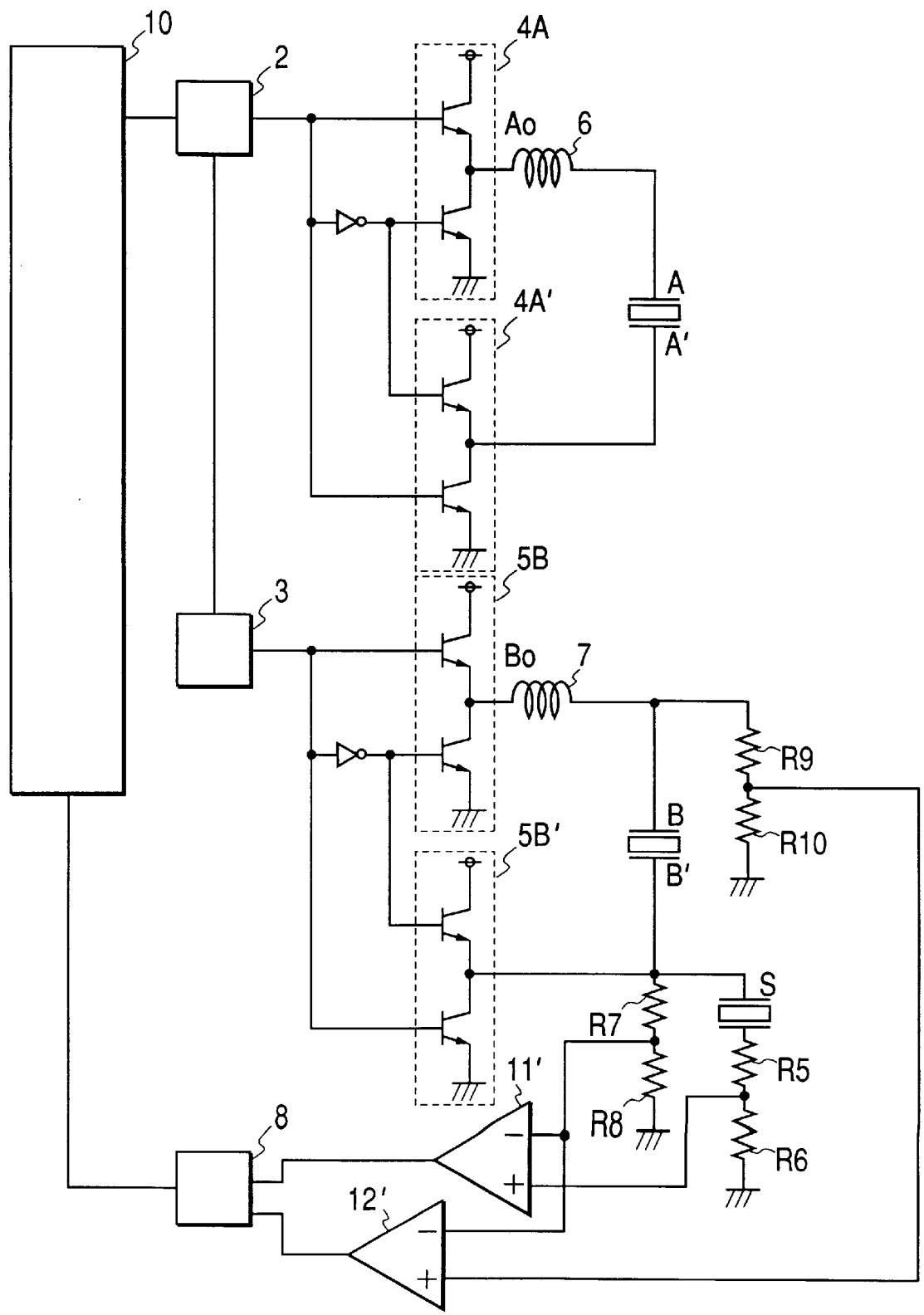
FIG. 3 is a schematic circuit diagram of a driving device for a vibration wave motor according to the second embodiment of the present invention.

FIG. 3 is a schematic circuit diagram of a driving device for a vibration wave motor according to the second embodiment to which the driving device for the vibration type actuator according to the present invention is applied.

In this embodiment, to apply the same voltage to the other end of each of the driving piezoelectric element and the vibration detection piezoelectric element, the B-phase driving piezoelectric element is used, in place of the A-phase driving piezoelectric element, as a driving piezoelectric element for extracting signals.

The relationship in phase difference between an output voltage from the A-phase driving piezoelectric element serving as a comparison voltage for vibration detection and an output voltage from the vibration detection piezoelectric element as in the first embodiment differs from that in this embodiment in which the B-phase driving piezoelectric element is used as a comparison voltage for vibration detection. However, any frequency deviation of the motor with respect to the resonant frequency can be determined as in the case wherein the A-phase driving piezoelectric element is used as a detection target. With this arrangement, if the voltage division ratio remains the same, one voltage dividing circuit can be shared by the piezoelectric elements.

As a result, the number of voltage dividing circuits can be reduced from four (in the first embodiment) to three.

(Third Embodiment)

Figure 4:
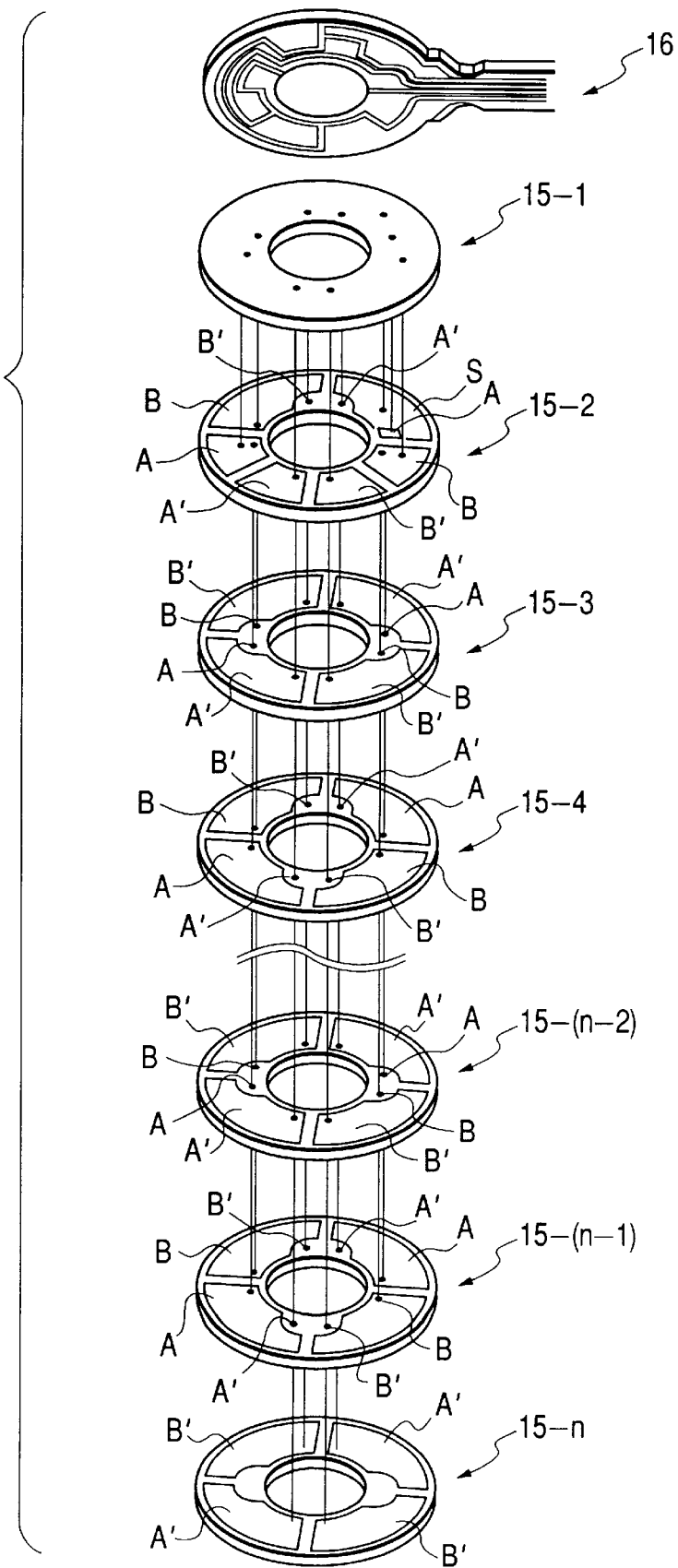
FIG. 4 is an exploded perspective view of the piezoelectric element of a vibration wave motor according to the third embodiment of the present invention.

FIG. 4 is an exploded perspective view showing the structure of the piezoelectric element portions of a vibration wave motor according to the third embodiment to which the vibration type actuator according to the resent invention is applied.

In this embodiment, a piezoelectric element has a multilayer structure. Electrodes are formed on one surface of the piezoelectric element member on each layer to form a piezoelectric element portion. Alternating voltages are respectively applied to the electrodes on the piezoelectric element members which oppose each other in the vertical direction. With this operation, the same effects as those obtained from the above described floating structure can be obtained.

Referring to FIG. 4, driving/vibration detection piezoelectric element portions 15-1 to 15-n constitute a multilayer structure using a through-hole "signal" lead-line structure and the like.

The piezoelectric element portion 15-2 is divided into five regions, i.e., driving electrodes A, A', B, and B' and a vibration detection piezoelectric element S. The piezoelectric element portions 15-3 to 15-n are energized using respective through-hole signal lead-lines. One surface of each of the piezoelectric element portions 15-3 to 15-n is patterned with a substantially cross-shaped insulating portion, thereby dividing the piezoelectric element portion into four regions. Of the electrodes in these four regions, pairs of diagonally opposing regions are respectively used for the A- and B-phase driving piezoelectric elements.

The electrodes on each piezoelectric element portion are separately formed in the four regions to effectively use the driving force produced by the motor. A detailed description of this operation will be omitted. The diagonally opposing electrodes are polarized in opposite directions.

Alternating voltages with different phases are applied from a flexible board 16 to the respective electrodes A, A', B, and B' on the piezoelectric element portions of this multilayer structure via the through holes in the piezoelectric element portion 15-1 on the uppermost layer. With this operation, this structure is driven as a vibration wave motor. Note that the positions of the electrodes A and B are 90° out of phase, and the alternating voltages applied to the electrodes A' and B' are 180° out of phase from those applied to the electrodes A and B.

According to this multilayer structure, since the piezoelectric element portions 15-1 to 15-n are integrally calcined into one unit, piezoelectric elements need not be stacked on each other through electrode plates. In addition, since the size and position of the vibration detection piezoelectric element S can be adjusted to some extent, the magnitude of the output voltage can be controlled.

If, therefore, the output voltage from the vibration detection piezoelectric element S is set to be almost equal to the driving voltage, when voltage division is performed at the same voltage division ratio, a decrease in S/N ratio of any of the resultant signals can be prevented.

By using driving and detection circuits like those shown in FIGS. 1 and 3 for the actuator having the arrangement shown in FIG. 4, signal processing at the TTL level can be performed.

(Fourth Embodiment)

Figure 5:
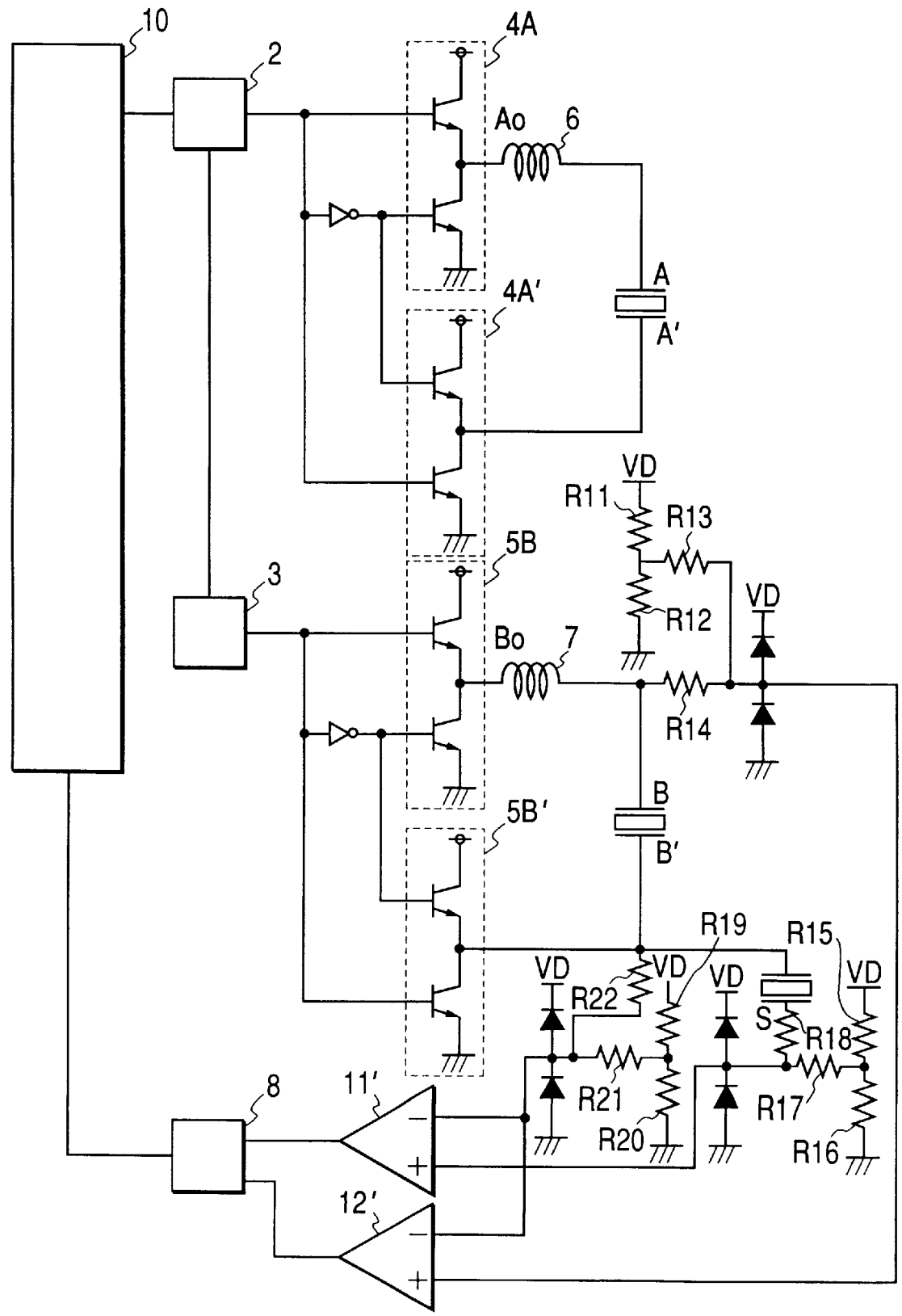
FIG. 5 is a schematic circuit diagram of a driving device for a vibration wave motor according to the fourth embodiment of the present invention.

FIGS. 5 and 6 show the fourth embodiment.

FIG. 5 is a schematic circuit diagram of a driving device for a vibration wave motor. Clipping circuits using, for example, diodes are arranged on the input sides of comparators 11' and 12'. In this case, the clipping circuit is a circuit for keeping the input voltage level within a certain voltage level range. The clipping circuit adjusts signal components outside the voltage range indicated by the dashed line in FIG. 6A within the desired range.

In addition, this device also includes an offset circuit to allow the use of a single-power-supply comparator. As described above, the comparator is a circuit for setting analog signals of 0 V to 5 V to "0" and "1" (5 V). When this comparator is to be used, "0" or "1" (5 V) is determined depending on whether the input voltage is higher or lower than a given voltage. This voltage is a threshold voltage. An analog signal in the voltage range of 0 V to 5 V is generally set to 2.5 V. The signal used in this embodiment has a sine waveform exhibiting changes in voltage level from zero to positive and negative. To convert this signal into a digital signal, the threshold voltage is preferably set to 0 V. For this purpose, a double-power-supply comparator (which operates in the range of a positive voltage to a negative voltage) is required. To perform the same operation by using a single-power-supply comparator (which operates in the voltage range of 0 V or higher), an input signal may be changed to the positive side. In this embodiment, this operation is performed by an offset circuit (resistors R11, R12, R13, resistors R19, R20, and R21, and resistors R15, R16, and R17).

Figure 6A:
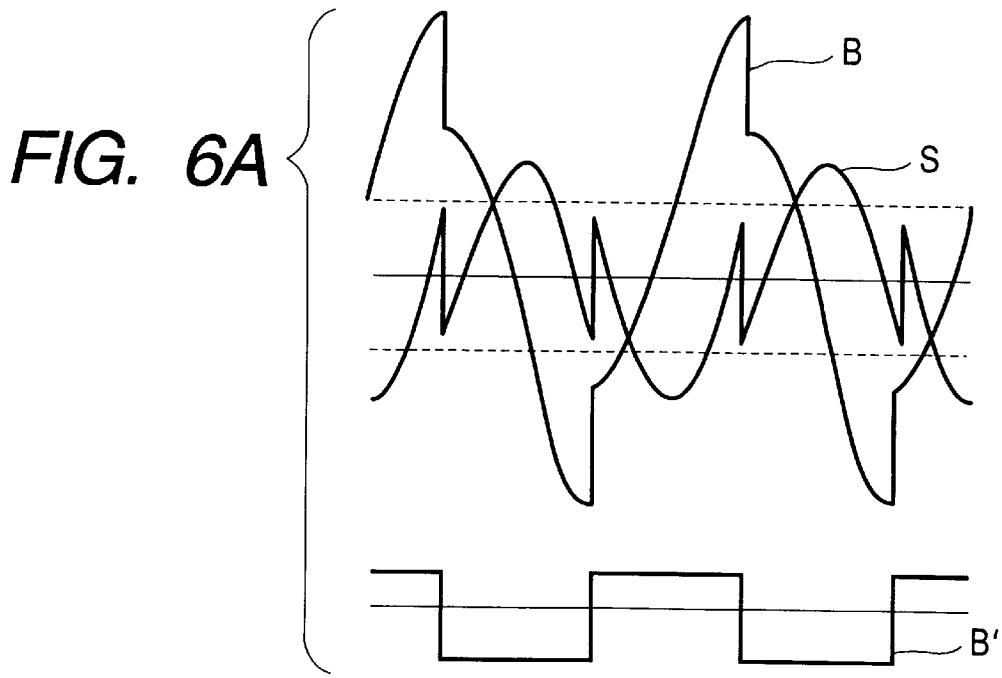
Figure 6B:
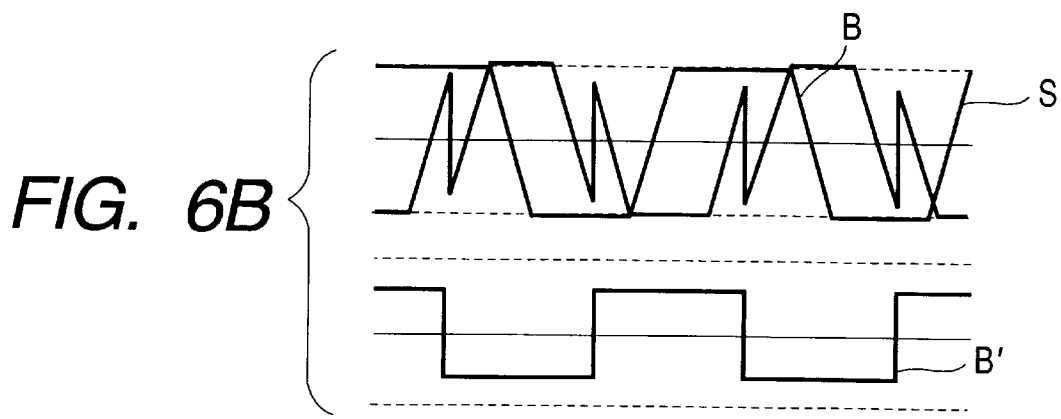
Figure 6C:
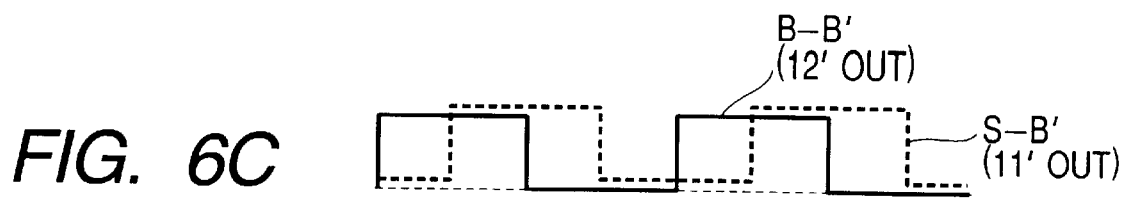

FIG. 6A shows the waveforms of output voltages from the B-phase driving piezoelectric element and the vibration detection piezoelectric element S in FIG. 5. FIG. 6B shows the waveforms of output voltages from the above clipping circuits. FIG. 6C shows the waveforms of outputs from the comparators.

Output voltages from the B-phase driving piezoelectric element and the vibration detection piezoelectric element S have the waveforms shown in FIG. 6A. The clipping circuits clip those components of the output voltages, which are higher than the TTL level to adjust them to a level within a small range, and input the resultant voltages to the comparators. At this time, the voltages at other ends A' and B' of the piezoelectric elements are clipped in the same manner as described above. In general, however, the voltages at the ends A' and B' are lower than the TTL level in many cases, the clipping circuits can be omitted.

FIG. 6C shows the output waveforms obtained from the comparators after the output voltages from the driving piezoelectric element and the vibration detection piezoelectric element S are processed in the above manner. In this case, the waveforms of the output voltages from the driving piezoelectric element and the vibration detection piezoelectric element S are converted into square waveforms to accurately detect the relationship in phase between the two output voltages.

Since output voltages from the driving piezoelectric element and the vibration detection piezoelectric element are compared with each other upon clipping in the above manner, phase information can be accurately obtained from even high voltages.

(Fifth Embodiment)

Figure 7:
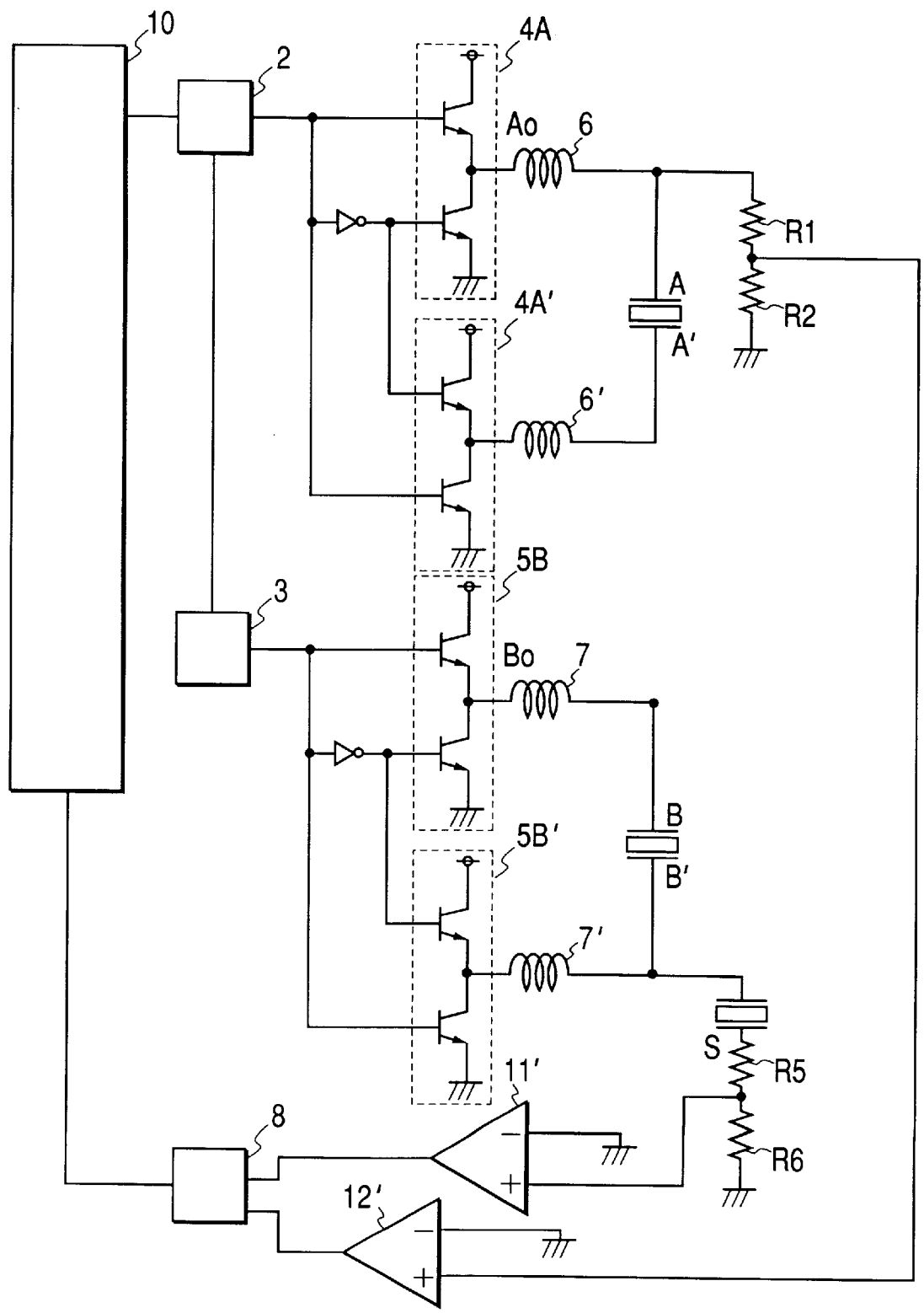
FIG. 7 is a schematic circuit diagram of a driving device for a vibration wave motor according to the fifth embodiment of the present invention.

FIG. 7 shows the fifth embodiment.

FIG. 7 is a schematic circuit diagram of a driving device for a vibration wave motor. An output from one end of the A-phase piezoelectric element is voltage-divided by resistors R1 and R2. The voltage-divided output from the A-phase piezoelectric element is input to the "+" input terminal of a comparator 12', and the voltage-divided output from a vibration detection piezoelectric element S is input to the "+" input terminal of a comparator 11'.

Figure 10:
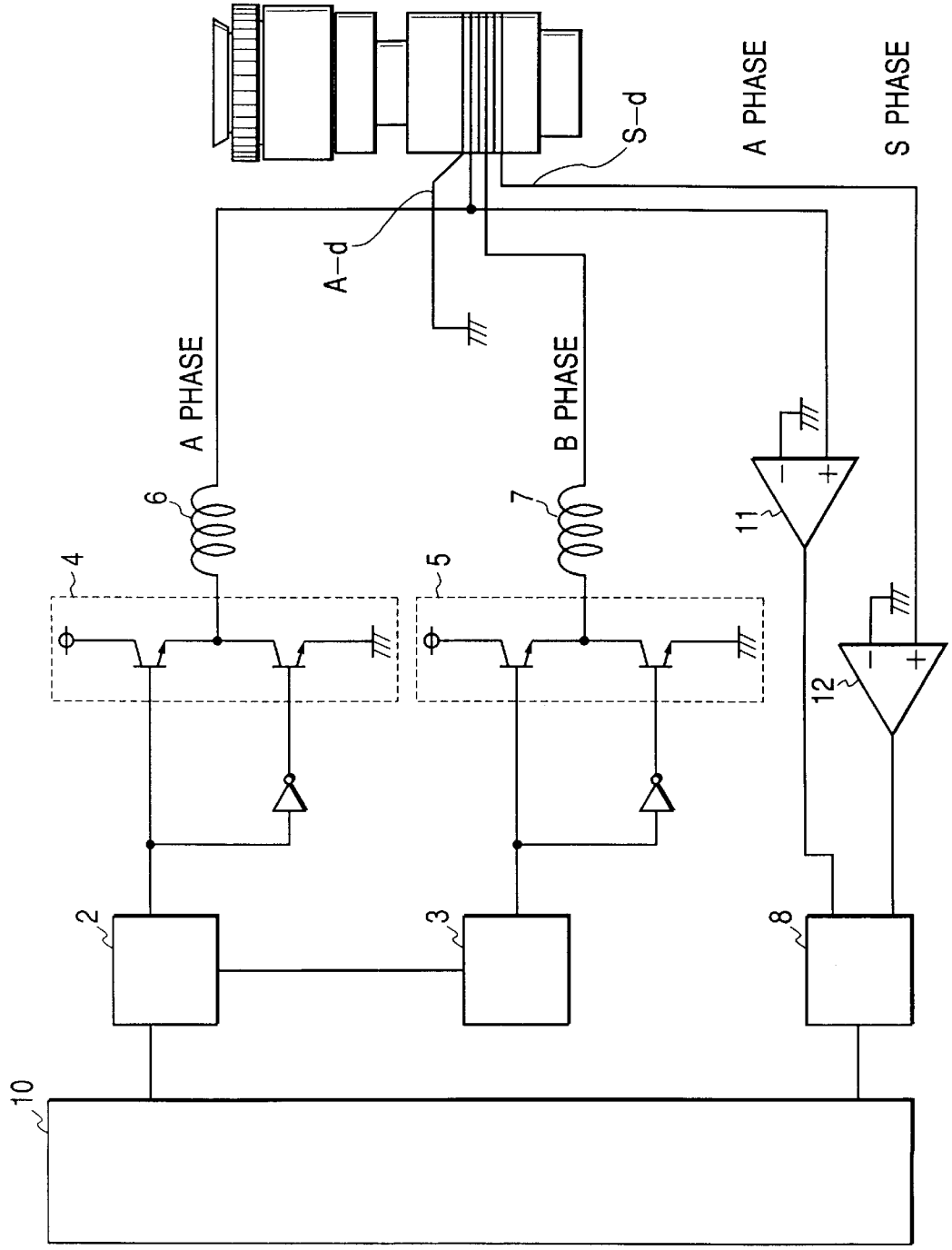
FIG. 10 is a schematic circuit diagram of a driving device for a vibration wave motor in FIG. 9.
Figure 11:
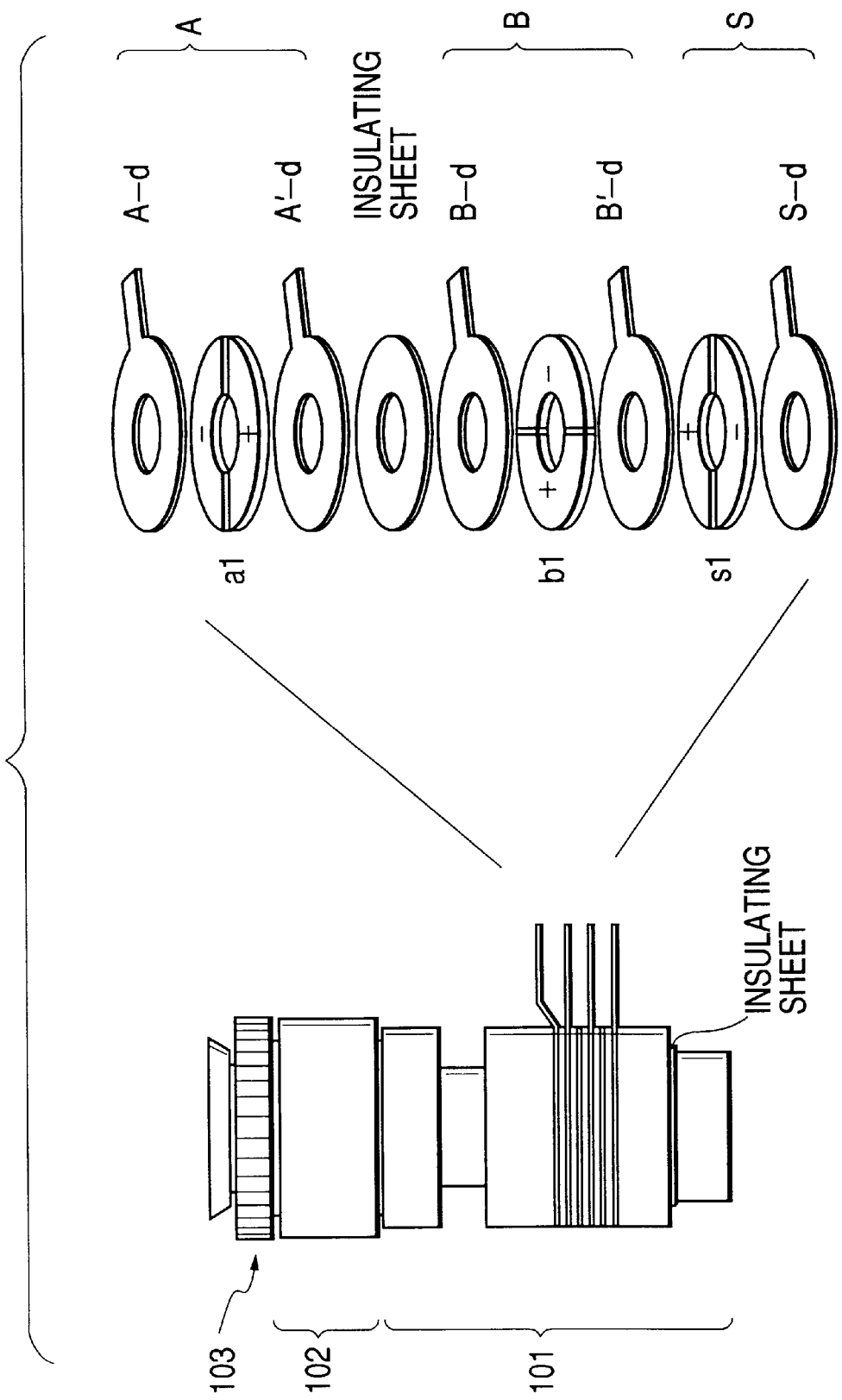
FIG. 11 is a schematic view of another conventional bar-shaped vibration wave motor.

In the conventional driving circuit in FIG. 10, the inductance element (coil) is connected to one end of each of the A- and B-phase driving piezoelectric elements. In this embodiment, inductance elements 6 and 6' are connected to the two ends of the A-phase driving piezoelectric element, and inductance elements 7 and 7' are connected to the two ends of the B-phase driving piezoelectric element.

The value of each inductance is approximately ½ that of each inductance connected to one end of each of the piezoelectric elements in the prior art. With this arrangement, the waveform of the voltage applied to one end A of the driving piezoelectric element becomes that of a regular sine wave. Accurate phase information can therefore be obtained without subtracting the voltage at the other end from the voltage at one end. The arrangement having an inductance element connected to one end of each piezoelectric element as in the first embodiment is equivalent to the arrangement having inductance elements, each having a value ½ that of the inductance element, connected to the two ends of each piezoelectric element in this embodiment in terms of impedance matching. With the arrangement having inductance elements connected to the two ends of each piezoelectric element, however, harmonic components of a rectangular wave are eliminated by the filter effect based on the capacitance of each piezoelectric element and each inductance, thereby obtaining a regular sine wave.

It suffices, therefore, if DC voltages of the GND level are input to the "−" input terminals of the comparators 11' and 12'. The number of voltage dividing circuits can therefore be reduced.

(Sixth Embodiment)

Figure 8:
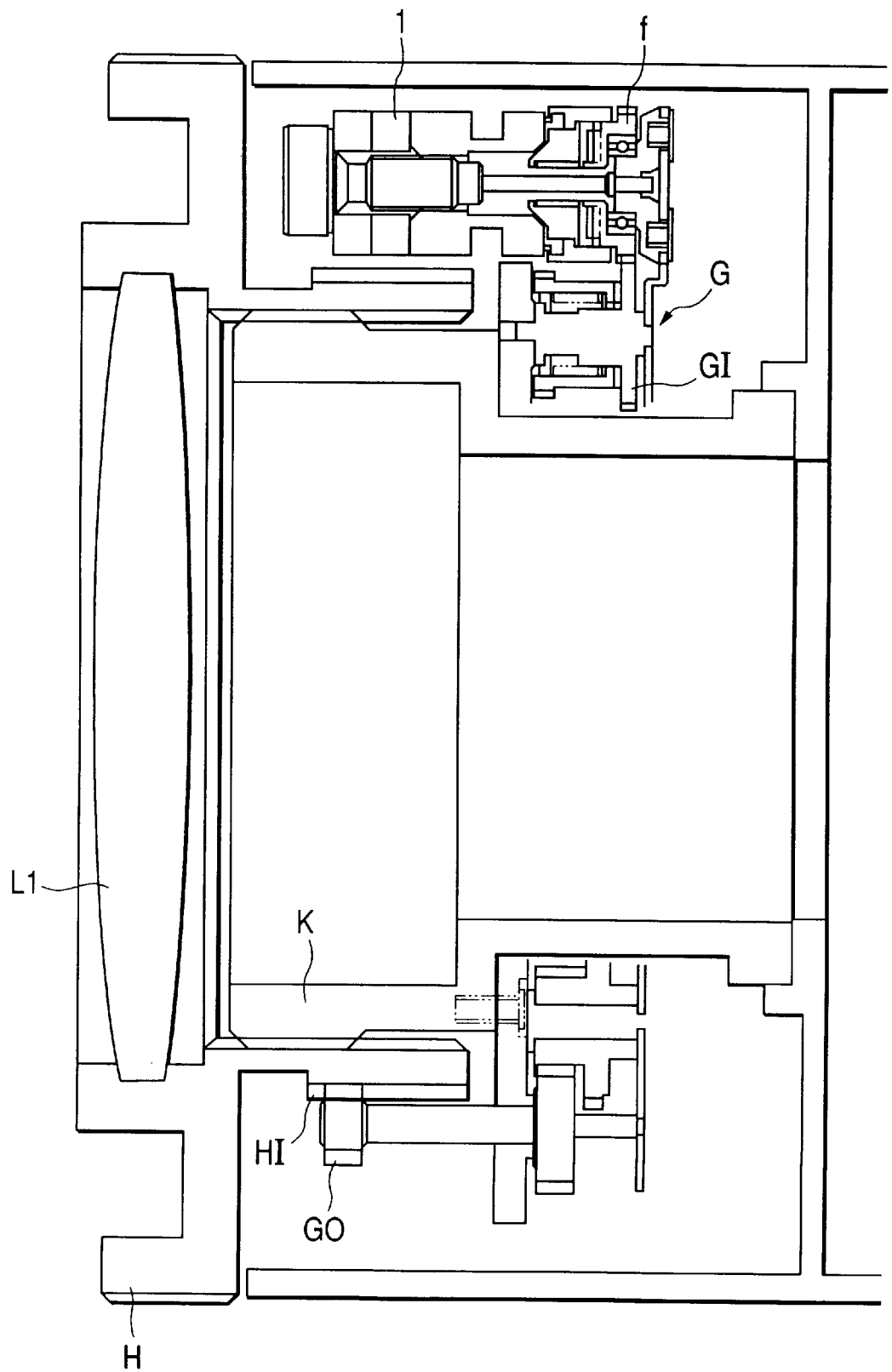
FIG. 8 is a sectional view of a lens driving device according to the sixth embodiment of the present invention.
Figure 9:
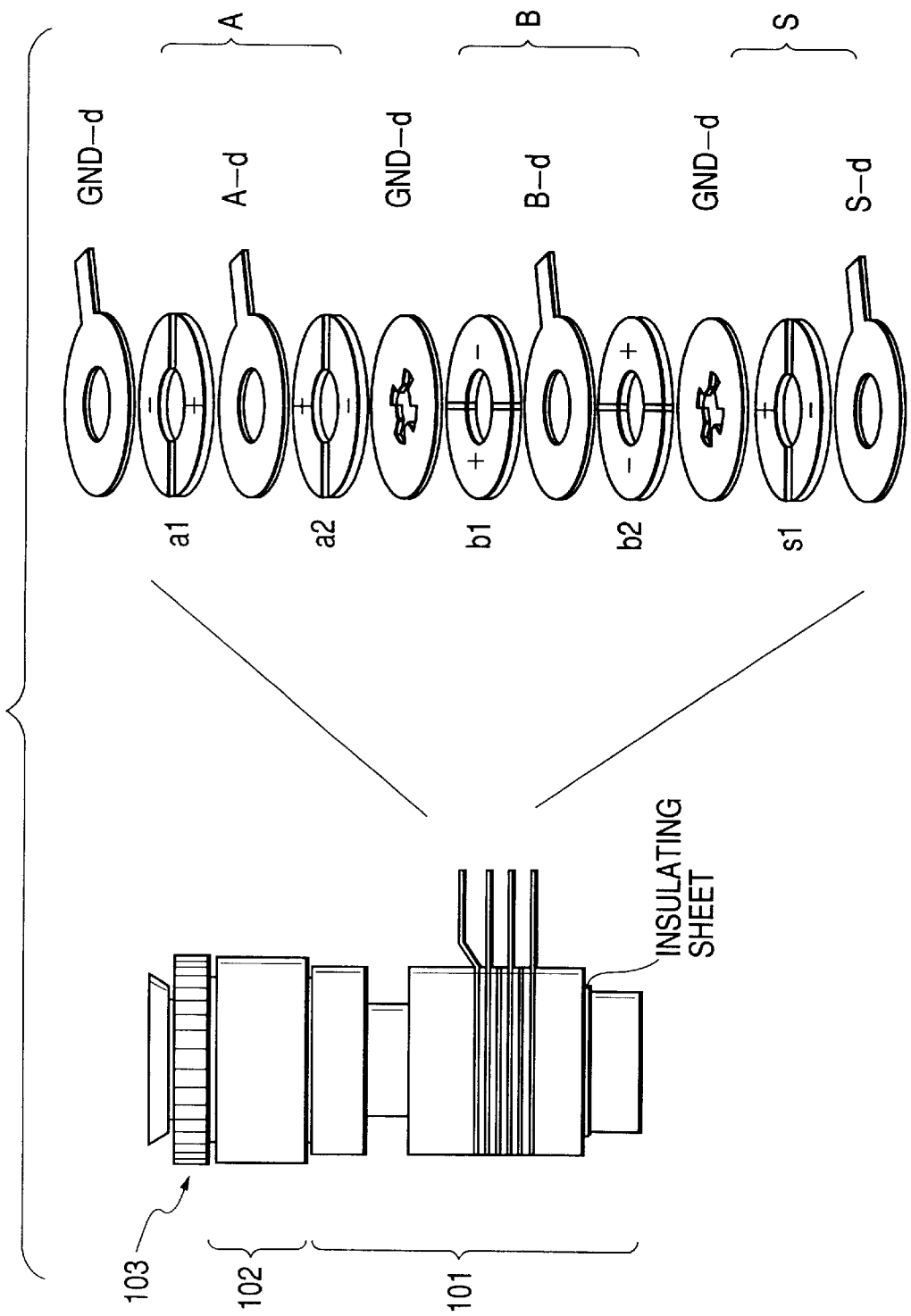
FIG. 9 is a schematic view of a conventional vibration wave motor.

FIG. 8 shows the sixth embodiment.

FIG. 8 shows a lens driving device using a vibration wave motor as a drive source, which is driven by the driving device or vibration wave motor according to the above embodiments.

A gear f integrally mounted on the vibration wave motor meshes with an input gear GI of a gear transmission mechanism G. An output gear GO meshes with a gear HI formed on a lens holding member H holding a lens L1. The lens holding member H is helicoid-coupled to a stationary cylindrical member K. The lens holding member H is rotated/driven by the driving force produced by the vibration wave motor through the gear transmission mechanism G, thereby performing focusing operation.

Although each embodiment described above has exemplified the bar-shaped vibration wave motor as a vibration type actuator, the present invention can be applied to any vibration type actuator such as an actuator having an annular shape as long as it has a detection piezoelectric element portion having a floating structure.

What is claimed is:

1. A vibration type motor device having a driving electro-mechanical energy converting element mounted on a vibrator and adapted to obtain a driving force by applying a frequency signal to said converting element or a movable member driving device including said vibration type motor device and adapted to drive a movable member using said motor device as a drive source, said device comprising:

a driving circuit for periodically applying a first voltage to one electrode of said driving electro-mechanical energy converting element and a second voltage 180° out of phase from the first voltage to the other electrode;

a vibration detection electro-mechanical energy converting element connected to the other electrode of said driving electro-mechanical energy converting element;

a first step-down circuit for stepping down a voltage at one electrode of said driving electro-mechanical energy converting element to a voltage not more than a predetermined voltage level;

a second step-down circuit for stepping down an output from said detection electro-mechanical energy converting element to a voltage not more than the predetermined voltage level; and a processing circuit for receiving outputs from said first step-down circuit and said second step-down circuit.

2. A device according to claim 1, wherein the first voltage is applied to said one electrode of said driving electro-mechanical energy converting element through an impedance element.

3. A device according to claim 2, further comprising a third step-down circuit for stepping down a voltage at the other electrode of said driving electro-mechanical energy converting element to a voltage not more than a predetermined voltage level, and wherein said processing circuit comprises a processing unit for receiving outputs from said third step-down circuit and second step-down circuit.

4. A device according to claim 2, wherein said first step-down circuit and said second step-down circuit are voltage dividing resistor circuits having voltage division ratios set equal to each other.

5. A vibration type motor device having a driving electro-mechanical energy converting element mounted on a vibrator and adapted to obtain a driving force by applying a frequency signal to said converting element or a movable member driving device including said vibration type motor device and adapted to drive a movable member using said motor device as a drive source, said device comprising:

a driving circuit for periodically applying a first voltage to one electrode of a first driving electro-mechanical energy converting element, and a second voltage 180° out of phase from the first voltage to the other electrode thereof, and periodically applying a third voltage having a phase different from that of the first voltage to one electrode of a second driving electro-mechanical energy converting element, and a fourth voltage 180° out of phase from the third voltage to the other electrode thereof;

a vibration detection electro-mechanical energy converting element connected to the other electrode of said second driving electro-mechanical energy converting element;

a first step-down circuit for stepping down a voltage at one electrode of said first driving electro-mechanical energy converting element to a voltage not more than a predetermined voltage level;

a second step-down circuit for stepping down an output from said detection electro-mechanical energy converting element to a voltage not more than the predetermined voltage level; and a processing circuit for receiving outputs from said first step-down circuit and said second step-down circuit.

6. A device according to claim 5, wherein the first voltage is applied to said one electrode of said first driving electro-mechanical energy converting element through an impedance element, and the third voltage is applied to said one electrode of said second driving electro-mechanical energy converting element through an impedance element.

7. A device according to claim 6, further comprising a third step-down circuit for stepping down a voltage at the other electrode of said first driving electro-mechanical energy converting element to a voltage not more than a predetermined voltage level, and wherein said processing circuit comprises a processing unit for receiving outputs from said third step-down circuit and said first step-down circuit.

8. A device according to claim 6, further comprising a third step-down circuit for stepping down a voltage at the other electrode of said second driving electro-mechanical energy converting element to a voltage not more than a predetermined voltage level, and wherein said processing circuit comprises a processing unit for receiving outputs from said third step-down circuit and said second step-down circuit.

9. A device according to claim 6, wherein said first step-down circuit and said second step-down circuit are voltage dividing resistor circuits having voltage division ratios set to be equal to each other.

10. A device according to claim 7, wherein said third step-down circuit is a voltage dividing resistor circuit having the same voltage division ratio as that of said first voltage dividing resistor circuit.

11. A device according to claim 8, wherein said third step-down circuit is a voltage dividing resistor circuit having the same voltage division ratio as that of said second voltage dividing resistor circuit.

12. A device according to claim 5, wherein the first voltage is applied to said one electrode of said first driving electro-mechanical energy converting element through an impedance element, the second voltage is applied to the other electrode thereof through an impedance element, the third voltage is applied to said one electrode of said second driving electro-mechanical energy converting element through an impedance element, and the fourth voltage is applied to the other electrode through an impedance element thereof.

13. A device according to claim 12, wherein said first step-down circuit and said second step-down circuit are voltage dividing resistor circuits having voltage division ratios set to be equal to each other.

14. A device according to claim 12, wherein said processing circuit comprises a first comparing circuit for comparing an output from said first step-down circuit with a reference value, and a second comparing circuit for comparing an output from said second step-down circuit with the reference value.

15. A vibration type motor device having a plurality of driving electro-mechanical energy converting elements mounted on a vibrator and adapted to obtain a driving force by applying frequency signals having different phases to said converting elements or a movable member driving device including said vibration type motor device and adapted to drive a movable member using said motor device as a drive source, comprising:

a vibration detection electro-mechanical energy converting element connected to at least one driving electro-mechanical energy converting element;

a first step-down circuit for stepping down a voltage to be applied to at least said one driving electro-mechanical energy converting element to a voltage not more than a predetermined voltage level;

a second step-down circuit for stepping down an output from said vibration detection electro-mechanical energy converting element to a voltage not more than the predetermined voltage level, and a processing circuit for receiving outputs from said first step-down circuit and said second step-down circuit.

16. A device according to claim 15, wherein said first step-down circuit and said second step-down circuit are voltage dividing resistor circuits having the same voltage division ratio.

17. A vibration type motor device having a plurality of driving electro-mechanical energy converting elements mounted on a vibrator and adapted to obtain a driving force by applying frequency signals having different phases to said converting elements or a movable member driving device including said vibration type motor device and adapted to drive a movable member using said motor device as a drive source, said device comprising:

a vibration detection electro-mechanical energy converting element connected to at least one driving electro-mechanical energy converting element;

a first step-down circuit for stepping down a voltage to be applied to said driving electro-mechanical energy converting element, to which said vibration detection electro-mechanical energy converting element is connected, to a voltage not more than a predetermined voltage level;

a second step-down circuit for stepping down an output from said vibration detection electro-mechanical energy converting element to a voltage not more than the predetermined voltage level; and a processing circuit for receiving outputs from said first step-down circuit and said second step-down circuit.

18. A device according to claim 17, wherein said first step-down circuit and said second step-down circuit circuits are voltage dividing resistor circuits having the same voltage division ratio.

19. A vibration type motor device having a plurality of driving electro-mechanical energy converting elements mounted on a vibrator and adapted to obtain a driving force by applying frequency signals having different phases to said converting elements or a movable member driving device including said vibration type motor device and adapted to drive a movable member using said motor device as a drive source, comprising:

a first step-down circuit and a second step-down circuit for respectively stepping down voltages to be applied to one electrode and the other electrode of at least one of said driving electro-mechanical energy converting elements to a voltage not more than a predetermined voltage level, and a processing circuit for receiving outputs from said first step-down circuit and said second step-down circuit.

20. A device according to claim 19, wherein said first step-down circuit and said second step-down circuit are voltage dividing resistor circuits having the same voltage division ratio.

21. A vibration type motor device having a plurality of driving electro-mechanical energy converting elements mounted on a vibrator and adapted to obtain a driving force by applying frequency signals having different phases to said converting elements or a movable member driving device including said vibration type motor device and adapted to drive a movable member using said motor device as a drive source, said device comprising:

- a vibration detection electro-mechanical energy converting element connected to at least one of said driving electro-mechanical energy converting elements;
- a first circuit for clipping a voltage to be applied to said driving electro-mechanical energy converting element, to which said detection electro-mechanical energy converting element is connected, to a voltage not more than a predetermined voltage level;
- a second circuit for clipping an output from said detection electro-mechanical energy converting element to a voltage not more than the predetermined voltage level; and
- a processing circuit for receiving outputs from said first circuit and said second circuit.

22. A vibration type motor device having a plurality of driving electro-mechanical energy converting elements mounted on a vibrator and adapted to obtain a driving force by applying frequency signals having different phases to said converting elements or a movable member driving device including said vibration type motor device and adapted to drive a movable member using said motor device as a drive source, comprising:

- a vibration detection electro-mechanical energy converting element connected to a first electrode of one driving electro-mechanical energy converting element;
- a first step-down circuit for stepping down a voltage to be applied to said first electrode of said one driving electro-mechanical energy converting element to not more than a predetermined level;
- a second step-down circuit for stepping down an output from said vibration detection electro-mechanical energy converting element to not more than the predetermined level; and
- a processing circuit for receiving outputs from said first and second step-down circuits.

23. A device according to claim 22, wherein said first and second step-down circuits are voltage dividing resistor circuits having the same voltage division ratio.

* * * * *

UNITED STATES PATENT AND TRADEMARK OFFICE
CERTIFICATE OF CORRECTION

PATENT NO. : 6,133,671
DATED : October 17, 2000
INVENTOR(S) : AKIO ATSUTA, ET AL.

It is certified that error appears in the above-identified patent and that said Letters Patent is hereby corrected as shown below:

Column 1

Line 58, "900" should read --90°--.
    Line 60, "900" should read --90°--.

Column 5

Line 24, "resent" should read --present--.
    Line 43, "signal" should read --signal- --.
    Line 58, "the" should be deleted.

Column 6

Line 40, "0" should not be bold.

Signed and Sealed this

Twenty-second Day of May, 2001

Attest:

NICHOLAS P. GODICI

Attesting Officer     Acting Director of the United States Patent and Trademark Office